(12) United States Patent
Meyer et al.

(10) Patent No.: US 9,808,756 B2
(45) Date of Patent: Nov. 7, 2017

(54) USE OF FERROUS SULFIDE FOR THE REMOVAL OF SELENIUM FROM GASES

(71) Applicant: Redox Technology Group LLC, Carmel, IN (US)

(72) Inventors: Gary J. Meyer, Indianapolis, IN (US); Thomas P. McCullough, Carmel, IN (US); Anthony J. Kriech, Indianapolis, IN (US)

(73) Assignee: Redox Technology Group, LLC, Indianapolis, IN (US)

( * ) Notice: Subject to any disclaimer, the term of this patent is extended or adjusted under 35 U.S.C. 154(b) by 0 days.

(21) Appl. No.: 15/248,537

(22) Filed: Aug. 26, 2016

(65) Prior Publication Data

US 2017/0056818 A1 Mar. 2, 2017

Related U.S. Application Data

(60) Provisional application No. 62/213,082, filed on Sep. 1, 2015, provisional application No. 62/233,842, filed on Sep. 28, 2015.

(51) Int. Cl.

| | |
|---|---|
| *B01D 53/64* | (2006.01) |
| *C01G 49/12* | (2006.01) |
| *B01D 53/14* | (2006.01) |
| *B01D 53/02* | (2006.01) |
| *B01D 53/46* | (2006.01) |
| *B01D 53/80* | (2006.01) |

(52) U.S. Cl.
CPC ....... *B01D 53/1493* (2013.01); *B01D 53/025* (2013.01); *B01D 53/46* (2013.01); *B01D 53/80* (2013.01); *B01D 2252/10* (2013.01); *B01D 2253/1128* (2013.01); *B01D 2257/93* (2013.01)

(58) Field of Classification Search
CPC ............ B01D 53/64; B01D 2253/1128; B01D 2253/25; B01D 2257/60; B01D 2257/602; B01D 2258/0283; C01G 49/12
See application file for complete search history.

(56) References Cited

U.S. PATENT DOCUMENTS

| | | |
|---|---|---|
| 6,719,828 B1 | 4/2004 | Lovell et al. |
| 7,288,499 B1 | 10/2007 | Lovell et al. |
| 7,575,629 B2 | 8/2009 | Yang et al. |
| 7,790,830 B2 | 9/2010 | Edmiston |
| 8,088,283 B2 | 1/2012 | Pate |
| 8,119,759 B2 | 2/2012 | Edmiston |
| 8,197,687 B2 | 6/2012 | Krogue et al. |
| 8,217,131 B2 | 7/2012 | Edmiston |
| 8,412,664 B2 | 4/2013 | Shankle |
| 9,034,285 B1 * | 5/2015 | McCullough .......... B01D 53/64 423/210 |
| 9,073,008 B2 * | 7/2015 | McCullough .......... B01D 53/64 |
| 2003/0103882 A1 | 6/2003 | Biermann et al. |
| 2007/0119300 A1 * | 5/2007 | Yang ...................... B01D 53/02 95/107 |
| 2007/0122327 A1 * | 5/2007 | Yang ...................... B01D 53/02 423/210 |
| 2009/0130013 A1 * | 5/2009 | Higgins ................. B01D 53/64 423/242.1 |
| 2014/0255280 A1 | 9/2014 | McCullough et al. |

FOREIGN PATENT DOCUMENTS

| | | | | |
|---|---|---|---|---|
| GB | 1 382 232 A | | 1/1975 | |
| GB | 2428598 A | * | 2/2007 | ............ B01D 53/02 |

OTHER PUBLICATIONS

Dong Suk Han, Bill Batchelor, and Ahmed Abdel-Wahab, "XPS Analysis of Sorption of Selenium(IV) and Selenium(VI) to Mackinawite (FeS)", *Environmental Progress & Sustainable Energy*, 2013, vol. 32, No. 1, (p. 84-93.).
Dong Suk Han, Bill Batchelor, and Ahmed Abdel-Wahab, "Sorption of selenium(IV) and selenium(VI) to mackinawite (FeS): Effect of contact time, extent of removal, sorption envelopes", *Journal of Hazardous Materials*, 2011, 186 (pp. 451-457).
Andreas C. Scheinots and Laurent Charlet, "Selenite Reduction by Mackinawite, Magnetite and Siderite: XAS Characterization of Nanosized Redox Products", *Environmental Science and Technology*, 2008, 42 (pp. 1984-1989).
S. C. B. Myneni, T. K. Tokunaga, G. E. Brown Jr., "Abiotic Selenium Redox Transformations in the Presence of Fe(II,III) Oxides", *Science*, 1997, 278, (pp. 1106-1109).
Great Britain Combined Search and Examination Report from corresponding Great Britain application No. GB1614751.4 dated Feb. 21, 2017 (5 pgs).

* cited by examiner

*Primary Examiner* — Timothy Vanoy
(74) *Attorney, Agent, or Firm* — Brinks Gilson & lione

(57) ABSTRACT

A liquid suspension comprised of ferrous sulfide particles and method of using the same for the removal of selenium from industrial gas. Said liquid suspension may be (1) directly injected, or (2) coated onto or into a substrate and then injected into an industrial gas containing selenium to remove said selenium from the industrial gas stream in a dry scrubber system. Said liquid suspension of ferrous sulfide particles may also be used to remove selenium contained in industrial gases in a wet scrubber system.

20 Claims, 4 Drawing Sheets

Total activity of dissolved $Fe^{2+}$ in equilibrium with $FeS_m$ (bold lines) at 25°C and total dissolved $S^{2-}$ concentrations, $\Sigma[S^{2-}]$, of $10^{-3}$ and $10^{-5}$ M resulting from the $Fe^{2-}$ activities of the pH-dependent and pH independent reactions (fine lines). Source: *"The solubility of FeS"*. David Rickard. Geochimica et Cosmochimica Acta 70 (2006) 5779–5789.

USE OF FERROUS SULFIDE FOR THE REMOVAL OF SELENIUM FROM GASES

RELATED APPLICATION

The present application is based on U.S. Provisional Patent Application Nos. 62/213,082, filed Sep. 1, 2015 and 62/233,842, filed Sep. 28, 2015, to each of which priority is being claimed under 35 U.S.C. §120 and of each of which the entire specifications are hereby expressly incorporated by reference.

BACKGROUND

The present invention relates generally to a ferrous sulfide suspension for the treatment and removal of selenium from industrial gases.

The emission of pollutants from coal-fired boilers is a major environmental concern. These pollutants may enter the environment in gaseous form (e.g. stack emissions), liquid form (e.g. discharges of treated or untreated wastewater effluents), or in the solid form (e.g. coal combustion byproducts).

Release of selenium to the environment, in particular as a pollutant contained in wastewater effluent discharges, is of particular concern.

Although selenium is an essential element in human and animal nutrition, selenium may become toxic if consumed in high levels. Therefore the concentration and total quantity of selenium in wastewater effluent discharges from coal-fired boilers, mining activities, and industrial sources is subject to strict government regulation.

Selenium is normally present in aqueous media such as wastewater effluents in the form of "selenite" ions and "selenate" ions. For the purposes of this disclosure, the terms "$SeO_3^{2-}$", "$Se^{4+}$", or "tetravalent selenium" have been used interchangeably when referring to the selenite ion, while the terms "$SeO_4^{2-}$", "$Se^{6+}$", or "hexavalent selenium" have been used interchangeably when referring to the selenate ion.

Certain pollutants (e.g. mercury), may be captured and removed from industrial gases by injection of a dry sorbent into the industrial gas stream with subsequent collection of the sorbent in a particulate matter control device such as an electrostatic precipitator or a fabric filter. These systems are collectively referred to as "dry scrubber" systems. Of the known dry sorbents, activated carbon and calcium-based sorbents have been the most actively studied and most widely used on a commercial basis.

Currently, the most commonly used sorbent in dry scrubber systems for mercury emission control in coal-fired and oil-fired plants is the injection of powdered activated carbon (PAC) into the flue gas stream.

Examples of other sorbents that have been used for mercury removal in dry scrubber systems include those disclosed in U.S. Patent Application Publication No. 2003/0103882 to Biermann et al and in U.S. Pat. No. 6,719,828 to Lovell et al. which discloses the preparation of layered sorbents such as clays with metal sulfides interlayered between the clay layers. Other patents for mercury capture by injection of dry sorbents are based upon preparation of the sorbents by thinly layering a chemical compound onto or into a substrate. These types of sorbents use substrates that include sol-gel derivatives as disclosed in U.S. Pat. No. 7,790,830 to Edmiston; U.S. Pat. No. 8,119,759 to Edmiston; and U.S. Pat. No. 8,217,131 to Edmiston, self-assembled monolayers on mesoporous supports as disclosed in U.S. Pat. No. 8,088,283 to Pate; U.S. Pat. No. 8,412,664 to Shankle; and U.S. Pat. No. 8,197,687 to Krogue et al., phyllosilicates as disclosed in U.S. Pat. No. 7,288,499 to Lovell et al., or variety of other substrates. In addition to these U.S. Pat. No. 7,575,629 to Yang et al. and U.S. Pat. No. 7,704,920 to Yang et al. disclose that any metal salt that can release a metal ion when the salt contacts a sulfide salt forming a water insoluble metal sulfide on the substrate surface can be used to produce an effective dry sorbent for mercury removal.

The aforementioned dry sorbents, which are complex and expensive to produce and use, may be effective for the removal of certain pollutants or contaminants from industrial gases, however these dry sorbents have not been shown to be effective in the removal of selenium from industrial gases.

Another type of scrubber system that is used to lower the emission of toxic gaseous pollutants or other contaminants to the environment are commonly referred to as "wet scrubbers". In a wet scrubber system, industrial gases containing pollutants or contaminants are brought into contact with a scrubbing liquid or slurry (scrubber liquor) to create a gas-liquid interface to transfer the pollutants or contaminants from the industrial gases into the scrubber liquor, either by (1) spraying the industrial gases containing pollutants or contaminants with the scrubber liquor, (2) by dispersing or forcing the industrial gases through the scrubber liquor, or (3) by any other means to transfer the pollutants or contaminants from the industrial gases into the scrubber liquor.

The composition of the scrubber liquors used in these wet scrubber systems varies depending upon the pollutants or contaminants in the industrial gases targeted for removal. For example, in a wet flue gas desulfurization device used to remove acids (e.g. HCl, $HSO_3$) or sulfur dioxide ($SO_2$), a slurry liquor containing limestone ($CaCO_3$), oxides or hydroxides of calcium or magnesium, or other mixtures are primarily used.

Although a particular wet scrubber system may be designed and operated to remove one or more targeted pollutants or contaminants, it may also concurrently remove other pollutants or contaminants from industrial gases to varying degrees of effectiveness. One of these pollutants or contaminants is selenium.

Since the environment in a wet scrubber system is dynamic, removal of any pollutant or contaminant from an industrial gas is complex. Successful removal of pollutants or contaminants from the industrial gas must account for the various equilibrium conditions present between the pollutants or contaminants in the industrial gas prior to entering the wet scrubber system.

Once the industrial gas containing pollutants or contaminants enters the wet scrubber system, the successful removal of these pollutants or contaminants from the industrial gas is predicated on concurrently controlling the physical and chemical reactions that are a result of interactions between the pollutants or contaminants in the industrial gas and the solid, liquid, and gaseous phases present (or created) in the entire wet scrubber system, and in particular the wet scrubber liquor itself.

Once selenium is removed from the industrial gas and the selenium is now in the wet scrubber liquor, removal of the selenium from the wet scrubber liquor is further complicated since the physical, chemical, and oxidation-reduction conditions required to remove the selenium from the wet scrubber liquor may be different (or diametrically opposed)

to those conditions required to treat or remove other target pollutants or contaminants contained in the wet scrubber liquor.

One complicating factor specific to the treatment or removal of selenium from scrubber liquors is the selenium species in wet scrubber liquors are predominantly selenate ions or selenate complexes which are more difficult and expensive to remove from the scrubber liquors.

In general, once scrubber liquors are no longer effective or useful for their intended purpose, the scrubber liquors are treated to lower the concentration or total mass loading of any pollutants or contaminants contained within the scrubber liquor and the treated wet scrubber liquor is discharged from the scrubber liquor wastewater treatment system into the environment.

One removal mechanism of pollutants or contaminants from industrial gas streams that become dissolved in the aqueous phase of wet scrubber liquors in wet scrubber systems relies upon absorption of the "ionic" or "oxidized" phase of the pollutant or contaminant. For example, a metal cation ("M") in the industrial gas phase may dissolve in the wet scrubber liquor, and if an oppositely charged anion ("X") is also present in wet scrubber liquor form an "MX" complex or MX precipitate. In these cases, absorption is a phenomenon whereby atoms, molecules, or ions that are present in the industrial gas stream are absorbed (taken up) by the volume of the bulk (liquid) phase.

Another removal mechanism is "adsorption" which is a physical phenomenon where atoms, ions, or molecules from a gas, liquid, or dissolved solid adhere (bind) to another solid surface. The exact nature of the bonding by adsorption is dependent upon the species involved, but the adsorption process is generally classified as physisorption (characteristic of weak van der Waals forces), chemisorption (characteristic of covalent bonding), or some other type of electrostatic attraction. In other words, absorption is the process through which a substance, originally present in one phase, is removed from that phase by dissolution into another phase (typically a liquid), as opposed adsorption which is the accumulation of atoms, ions, or molecules from a bulk liquid or gas onto a solid surface.

A variety of treatment technologies, including reverse osmosis, ion exchange, coagulation, adsorption, and biological treatment, have been applied in order to remove selenium from aqueous media (e.g. wastewaters, scrubber liquors). Among them, adsorption using Fe-, Mn-, or Al-(oxy)hydroxides has been extensively studied because adsorption of aqueous selenium species onto such mineral surfaces plays an important role in determining the mobility and bioavailability of selenium. Although these treatment methods may be able to lower both $Se^{2-}$ and $Se^{4+}$ to below 5 µg/L, they are not suitable for treatment or removal of $Se^{6+}$ in wastewaters originating at coal-fired power plants or other industrial activities also containing high concentration of sulfate ions (($SO_4^{(2-)}$)) since the physio-chemical properties of sulfate ions are similar to that of $Se^{(+6)}$, and as a result, the competitive adsorption of sulfate ions significantly decreases the removal efficiency of $Se^{(+6)}$ from these types of wastewaters.

The present invention overcomes the disadvantage of removal of selenium from industrial gases by (1) sorbents in dry scrubbers systems which are primarily based on adsorption onto the sorbent, and (2) treatment or removal of selenium containing wet scrubber liquors wastewaters prior to discharge to the environment.

BRIEF SUMMARY

According to various features, characteristics and embodiments of the present invention which will become apparent as the description thereof proceeds, the present invention provides a method of removing selenium from an industrial gas which method comprises of the steps of:

contacting an industrial gas containing selenium with:
a liquid suspension of ferrous sulfide particles, or
a liquid suspension of ferrous sulfide particles that have been coated onto or impregnated into a substrate; and
allowing selenium contained in the industrial gas to react with the a liquid suspension of ferrous sulfide particles, or a liquid suspension of ferrous sulfide particles that have been coated onto or impregnated into a substrate, and be removed by at least one of:
i) adsorption of the selenium onto the surface of ferrous sulfide in the ferrous sulfide suspension or onto a liquid suspension of ferrous sulfide particles that have been coated onto or impregnated into a substrate;
ii) adsorption of the selenium onto iron (hydr)-oxides or green rusts; and
iii) absorption by reacting with the sulfide portion of the ferrous sulfide particles to form ferrous selenide (FeSe) as a precipitate.

The present invention further provides an improvement for methods of using a wet gas scrubber system to remove selenium from an industrial gas, wherein the wet gas scrubber system contains a scrubber liquor and are configured for receiving and scrubbing an industrial gas with a scrubber liquor, the improvement comprising providing as a scrubber liquor a liquid suspension of ferrous sulfide particles.

The present invention further provides a wet scrubber liquor composition for use in a wet scrubber system to remove selenium from an industrial gas, which comprises a liquid suspension of ferrous sulfide particles.

The present invention further provides a sorbent composition for use in for dry scrubber systems to remove selenium from an industrial gas, which comprises a liquid suspension of ferrous sulfide particles that has been coated onto or impregnated into a substrate.

BRIEF DESCRIPTION OF THE DRAWINGS

The present invention will be described with reference to the attached drawings which are given as non-limiting examples only, in which.

DETAILED DESCRIPTION OF THE DRAWINGS AND THE PRESENTLY PREFERRED EMBODIMENTS

Figure 1A:
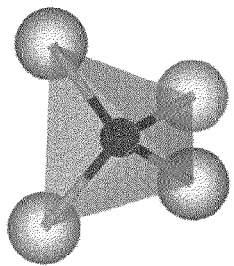
FIGS. 1a and 1b represent a "single cell" and a "sheet" of $FeS_m$ (mackinawite) respectively.

The present invention provides a ferrous sulfide suspension, a method for producing the ferrous sulfide suspension, and methods for using the ferrous sulfide suspension for the treatment and removal of selenium from industrial gases.

The ferrous sulfide suspension of the present invention is a minimally soluble, colloidal suspension that can be used to enhance the selenium removal capabilities of wet scrubber systems, or if coated onto or impregnated into a substrate, used as a sorbent, used to enhance the selenium removal capabilities of dry scrubber systems.

Through a combination of complex chemical reactions, precipitation, co-precipitation, and surface adsorption the ferrous sulfide suspension of the present invention can effectively remove selenium from industrial gases while preventing or minimizing the formation of selenate ions.

The alkaline ferrous sulfide suspension of the present invention can be produced by combining together a ferrous ion source (e.g. $FeCl_2$), a sulfide ion source (e.g. NaHS), and an alkalinity source (e.g. NaOH). According to different embodiments of the present invention the molar ratio of the ferrous ion source, sulfide ion source, and alkalinity source can be controlled/adjusted during the scrubbing of a flue gas so as to control/adjust the concentration of the insoluble ferrous sulfide (FeS).

The alkaline ferrous sulfide suspension can be used in a wet scrubbing liquor in any type of wet gas scrubber system, including but not limited to venturi scrubbers, spray scrubbers, cyclone spray chambers, orifice scrubbers, impingement scrubbers, packed bed scrubbers, and jet bubbling reactors (JBR).

During the course of the present invention the inventors discovered that a liquid suspension of containing minimally soluble ferrous sulfide (or a liquid suspension of containing minimally soluble ferrous sulfide coated or impregnated onto or into a substrate) efficiently and economically removes selenium by both absorption and adsorption mechanisms while simultaneously retarding or preventing the oxidation of lower valence states of selenium to selenate ($Se^{6+}$).

Though the combination of various molar ratios of a ferrous ion source (e.g. $FeCl_2$), a sulfide ion source (e.g. NaHS), and an alkalinity source (e.g. NaOH), the resulting alkaline liquid suspension containing FeS particles provides an economical and efficient reagent for selenium removal from industrial gas streams.

Ferrous sulfide, sometimes referred to as mackinawite, disordered mackinawite, and amorphous ferrous sulfide disassociates according to the following reaction:

$$FeS \leftrightarrow Fe^{2+} + S^{2-} \quad (1)$$

Depending upon the environment in which ferrous sulfide is formed, the solubility product constant (Ksp) will be between $1 \times 10^{-3}$ and $1 \times 10^{-5}$. Since this is many orders of magnitude higher than the solubility product of FeSe (Ksp=$3 \times 10^{-19}$), in the presence of selenide ions ($Se^{2-}$) that may be present (or formed) in the industrial gas or in the scrubber liquor of a wet scrubber system, the formation FeSe is favored and rapid. By providing the ferrous ion ($Fe^{2+}$) ion in the form of a minimally soluble ferrous sulfide solid particle, only the stoichiometric amount of sulfide will enter the scrubber liquor that is necessary to precipitate any $Se^{2-}$. The advantage of the present invention when compared to the prior art, is the possibility of "over" or "under" dosing the required amount of ferrous iron necessary to precipitate the $Se^{2-+}$ is mitigated.

The present invention also allows for the ability to adjust the molar ratios of the ferrous ion source, sulfide ion source, and alkalinity source to produce a ferrous sulfide suspension for selenium removal from industrial gases in a real-time, continuous basis. The ability to adjust the concentration of insoluble FeS in suspension, the ability to produce a ferrous sulfide suspension with specified concentrations of ferrous ions (or sulfide ions) by adjusting the stoichiometry of the feedstocks, pH, or combinations of both offers unique flexibility to produce a suspension of ferrous sulfide particles for removal of selenium from industrial gases that was not heretofore possible or foreseen.

During the course of the present invention the inventors unexpectedly discovered that a liquid suspension containing minimally soluble ferrous sulfide (FeS) can efficiently and economically remove $Se^{2-}$, $Se^{2+}$, and $Se^{4+}$ ions by absorption and adsorption mechanisms while simultaneously minimizing or limiting formation of the selenate ($Se^{6+}$) ion.

Though the combination of various molar ratios of a ferrous ion source (e.g. $FeCl_2$), a sulfide ion source (e.g. NaHS), and an alkalinity source (e.g. NaOH), the resulting alkaline liquid suspension containing FeS particles provides an economical and efficient wet scrubber liquor additive suitable for selenium removal from industrial gas streams, or when coated onto or impregnated into a substrate, used as a sorbent to enhance the selenium removal capabilities from industrial gases in dry scrubber systems.

Ferrous sulfide, sometimes referred to as mackinawite, disordered mackinawite, amorphous ferrous sulfide disassociates by the following reaction:

$$FeS \leftrightarrow Fe^{2+} + S^{2-} \quad (2)$$

Figure 1B:
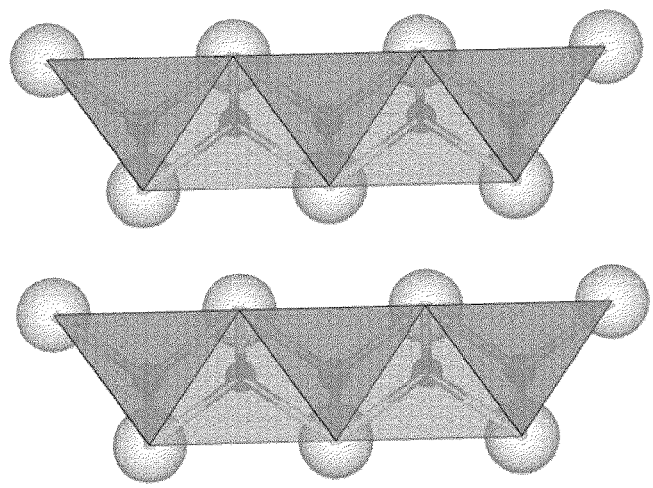

FIGS. 1a and 1b represent a "single cell" and a "sheet" of $FeS_m$ (mackinawite). In these figures it is noted that each iron ion is "four-way" coordinated to each sulfur ion.

Depending upon the environment containing the selenium, the selenium may be present as a selenide ion ($Se^{2-}$). The mechanisms for binding $Se^{2-}$ to $FeS_m$ (mackinawite) are believed to involve $Se^{2-}$ adsorption to the $FeS_m$ surface (3), precipitation as FeSe (4), or combination of both:

$$\equiv SFe + Se^{2-} \leftrightarrow \equiv ESFe\text{---}Se^{2-} \quad (3)$$

$$FeS_{(S)} + Se^{2-} \leftrightarrow FeSe + S^{2-} \quad (4)$$

Herein adsorption is meant to encompass all processes responsible for $Se^{2-}$ accumulation at the $FeS_m$-liquid interface (e.g., surface complexation at low surface coverage) and surface precipitation at high surface coverage.

In other environmental conditions, selenium may be present as the selenite ion ($Se^{4+}$). Research has demonstrated that $Se^{4+}$ is reduced by FeS through intermediates such as $Se^0$ to less soluble species such as $Se^{2-}$, followed by formation of a solid phase with a structure similar to FeSe or $FeSe_x$. (*XPS Analysis of Sorption of Selenium(IV) and Selenium(VI) to Mackinawite (FeS)*. Dong Suk Han, Bill Batchelor, and Ahmed Abdel-Wahab, (Environmental Progress & Sustainable Energy. 2013 (Vol. 32, No. 1), p. 84-93.")

Figure 2:
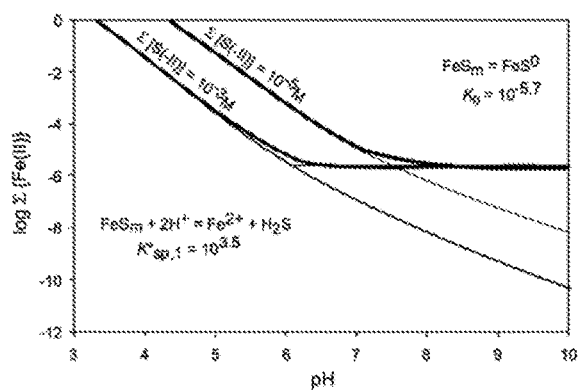
FIG. 2 is a graph of the total activity of dissolved $Fe^{2+}$ in equilibrium with $FeS_m$ at 25° C. Total activity of dissolved Fe(II) in equilibrium with $FeS_m$

Other research indicates the mechanisms of absorption an adsorption of selenite was different depending upon pH. (*Sorption of selenium(IV) and selenium(VI) to mackinawite (FeS): Effect of contact time, extent of removal, sorption envelopes*. Dong Suk Han, Bill Batchelor, and Ahmed Abdel-Wahab. Journal of Hazardous Materials 2011 (186) 451-457. See also, *Selenite Reduction by Mackinawite, Magnetite and Siderite: XAS Characterization of Nanosized Redox Products*. Andreas C. Scheinots and Laurent Charlet. Environmnetal Science and Technology 2008 (42) 1984-1989). Since mackinawite solubility increases by about four (4) orders of magnitude when decreasing the pH from 6.6 to 4.4 (see FIG. 2), the final redox reaction products in presence of mackinawite at these two different pH values (FeSe at pH 4.4; $Se^0$ at pH 6.3), suggests the final reaction product is significantly influenced by the solubility of mackinawite.

Thus, the likely reaction pathways based on the assumption of heterogeneous surface reactions allowed these researchers to conclude the following:

The reaction at pH 4.4:

$$6 \text{Fe}^{2+} + \text{HSeO}_3^- + \text{FeS} + 6\text{H}^+ \rightarrow 6 \text{Fe}^{3+} + \text{FeSe} + \text{HS}^- + 3\text{H}_2\text{O} \qquad (5)$$

The reaction at pH 6.3:

$$4 \text{Fe}^{2+} + \text{HSeO}_3^- + 5\text{H}^+ \rightarrow 4 \text{Fe}^{3+} + \text{Se}_{(S)} + 3\text{H}_2\text{O}. \qquad (6)$$

At higher pHs (e.g. pH=7 to 8), $Se^{4+}$ removal was better described by the BET isotherm (initially very fast followed by a relatively slower removal rate) it can be inferred that some multilayer sorption occurs at these higher pHs.

Selenium may also be present as the selenate ion ($Se^{6+}$), particularly in scrubber liquors. Although the aforementioned research indicated that greater than ten percent (10%) of $Se^{6+}$ may be removed from solutions during the first hour irrespective of initial $Se^{6+}$ concentrations, the additional removal of $Se^{6+}$ rapidly slowed thereafter. The lower extent and slower rate of uptake of $Se^{6+}$ compared to that of $Se^{4+}$ may have be due to a lower affinity of $Se^{6+}$ for the FeS surface. At pHs>7, this likely occurs since the FeS surfaces are negatively charged, and $Se^{6+}$ would be present as an anion with two negative charges compared to $Se^{4+}$ which would be present mostly as an anion with one negative charge.

The effect of competitive ions such as sulfate ($SO_4^{2-}$) which are prevalent in a majority of scrubber liquors at coal-fired boilers had a negligible effect on removal of $Se^{4+}$ by FeS, however surprisingly, there was some indication that the higher level of sulfate resulted in increased $Se^{6+}$ removal. The enhanced removal of $Se^{6+}$ could have been caused by association of another intermediate solid-phase product such as green rust (GR).

Green Rust (GR) is a mixed $Fe^{2+}/Fe^{3+}$ (oxy)hydroxide with the general formula;

$$[\text{Fe}^{2+}_{(1-x)} \text{Fe}^{3+}_x (\text{OH})_2][x/n \text{ An}^-:m\text{H}_2\text{O}] \qquad (7)$$

where "An$^-$" is a anion (e.g. $SO_4^{2-}$, $CO_3^{2-}$, $Cl^-$) located in the water interlayer to provide electron charge balance.

Since $Se^{4+}$ is more readily reduced than $Se^{6+}$, the standard state redox potentials of Fe and Se species suggests that $Fe^{2+}$ should be able reduce to $Se^{6+}$ to $Se^0$ or $Se^{2-}$. The overall reaction could be written as:

$$\text{Se}^{6+}\text{O}_4^{2-} + 8\text{Fe}^{2+} + 9\text{H}^+ \rightarrow 8\text{Fe}^{3+} + \text{HSe}^- + 4\text{H}_2\text{O} \qquad (8)$$

The above equation however only describes the reaction in the aqueous phase as a function of pH, and more importantly, does not account for any solid surface reactions or kinetics (time required). Although $Fe^{2+}$ is present primarily as the an "aqua-ion" [Fe(H$_2$O)$_6$] in acidic solutions, it will precipitate as green rust in the presence of $Fe^{3+}$ at pH>4.0, or as Fe(OH)$_2$ in the absence of $Fe^{3+}$ at pH>8.0.

In theory therefore, $Se^{6+}$ reduction at pH 4.0 may occur by homogeneous reactions in the aqueous phase, by heterogeneous reactions either on GR surfaces by adsorption and reduction, in GR interlayers by co-precipitation and reduction, or any combination of these mechanisms.

Selenate ($Se^{6+}$) treated with mackinawite (FeS$_m$) in an acidic solution (pH=3.5), where aqueous $Fe^{2+}$ exists primarily as the aqua ion [Fe(H$_2$O)$_6$] and without any GR precipitate, indicate that $Se^{6+}$ was not reduced within 160 hours of reaction, and the $Se^{6+}$ remained as uncomplexed $SeO_4^{2-}$. In contrast however, aqueous $Se^{6+}$ was "unstable" in samples prepared at pH>5.0. Under these conditions, the "mixed valence" GR precipitated initially and, over time, converted to "Fe$^{3+}$-oxides" at pH 7.0 (magnetite and lepidocrocite) and to only magnetite at pH 9.5. Magnetite and lepidocrocite are formed when the $Fe^{2+}$ present in the green rust becomes fully oxidized to $Fe^{3+}$. The presence of GR and its oxidized products strongly influences the aqueous and solid-phase Se speciation, and therefore potential removal efficiency. When the selenium concentration is below the saturation limit for known Se solids, precipitation can be ruled out as the primary mechanism for Se removal. Selenate ($Se^{6+}$) transformations may therefore occur within the interlayers, on the external surfaces of the GR, or both. The reduction of interlayer substituted $Se^{6+}$ to $Se^0$ promotes magnetite formation at the expense of GR, and the reduced $Se^0$ atoms forms clusters on the GR particle surfaces. The rapid precipitation kinetics and the flexible crystal structure of GR may allow its formation under a variety of geochemical conditions. By way of example, GR with interlayers of sulfate can promote selenate ($Se^{6+}$) reduction and be summarized by the following reaction:

$$\text{HSeO}^{4-} + 4\text{Fe}^{(2+)}\text{Fe}^{(3+)}(\text{OH})_{12}\text{SO}_4:3\text{H}_2\text{O} \leftrightarrow \text{HSe}^- + 8\text{Fe}_3\text{O}_4 + 4\text{SO}_4^{2-} + 8\text{H}^+ + 32\text{H}_2\text{O} \qquad (9)$$

("*Abiotic Selenium Redox Transformations in the Presence of Fe(II, III) Oxides*". S. C. B. Myneni, T. K. Tokunaga, G. E. Brown Jr. Science 1997 (278), 1106-1109.

Figure 3:
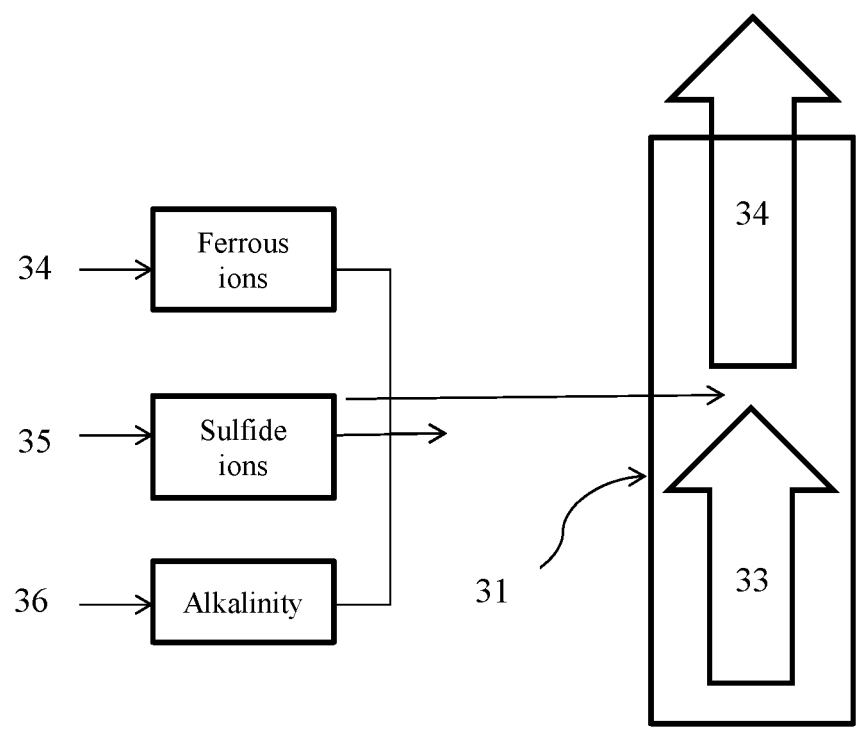
FIG. 3 is a diagram of a process for removing selenium from an industrial gas according to one embodiment of the present invention using a wet scrubber system

FIG. 3 is a diagram of a process for removing selenium from an industrial gas according to one embodiment of the present invention. As depicted in FIG. 3 a source of ferrous ions (e.g. FeCl$_2$) 34, a source of sulfide ions (e.g. NaHS) 35, and an alkalinity source (e.g. NaOH) 36 are combined together to produce an alkaline liquid suspension of ferrous sulfide particles. The alkaline liquid suspension of ferrous sulfide particles is used as a wet scrubber liquor additive in a wet gas scrubber system 31 through which an industrial gas stream containing selenium 32 is passed to produce a selenium-free industrial gas stream 33.

The process depicted in FIG. 3 allows for control/adjustment of the molar ratio of the ferrous ion source, sulfide ion source, and alkalinity source during processing allowing for a real time control/adjustment of the concentration of the minimally soluble ferrous sulfide (FeS) in the wet scrubbing liquor additive. In the alternative, the minimally soluble ferrous sulfide suspension can be made off-site, transported to the location of the site of the wet scrubber system and then injected into the wet scrubber liquor.

Figure 4:
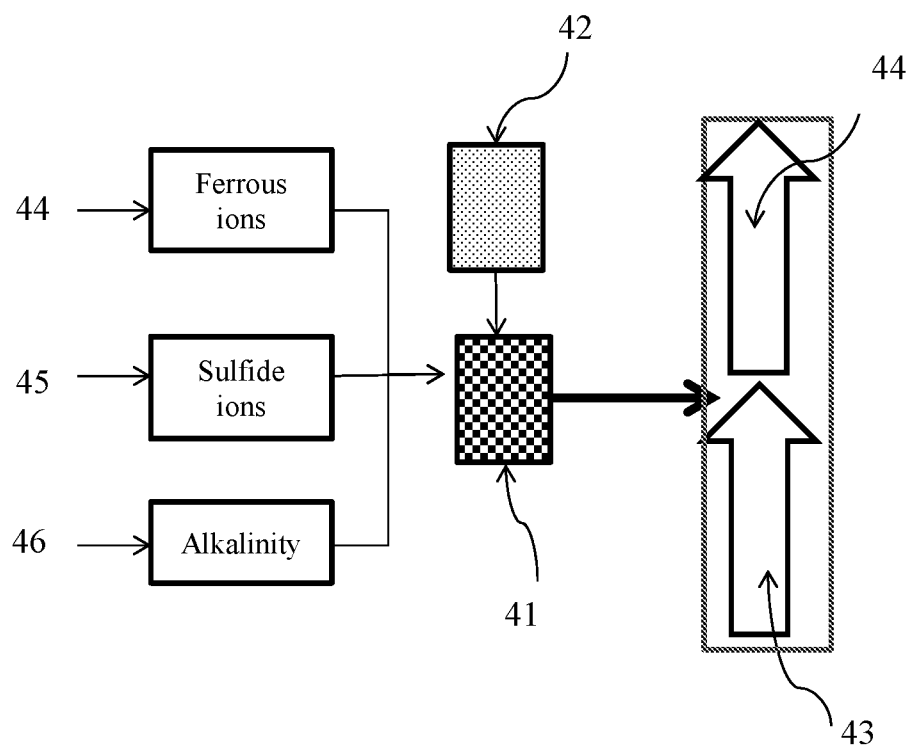
FIG. 4 is a diagram of a process for removing selenium from an industrial gas according to one embodiment of the present invention within a dry scrubber system

FIG. 4 is a diagram of a process for removing selenium from an industrial gas according to another embodiment of the present invention. As depicted in FIG. 4 a source of ferrous ions (e.g. FeCl$_2$) 44, a source of sulfide ions (e.g. NaHS) 45, and an alkalinity source (e.g. NaOH) 46 are combined together to produce an alkaline liquid suspension of ferrous sulfide particles. The alkaline liquid suspension of ferrous sulfide particles is then coated onto or impregnated into a substrate 42. The then coated or impregnated substrate 41 is then injected into an industrial gas containing selenium 43 to produce a selenium-free industrial gas stream 44.

Figure 5:
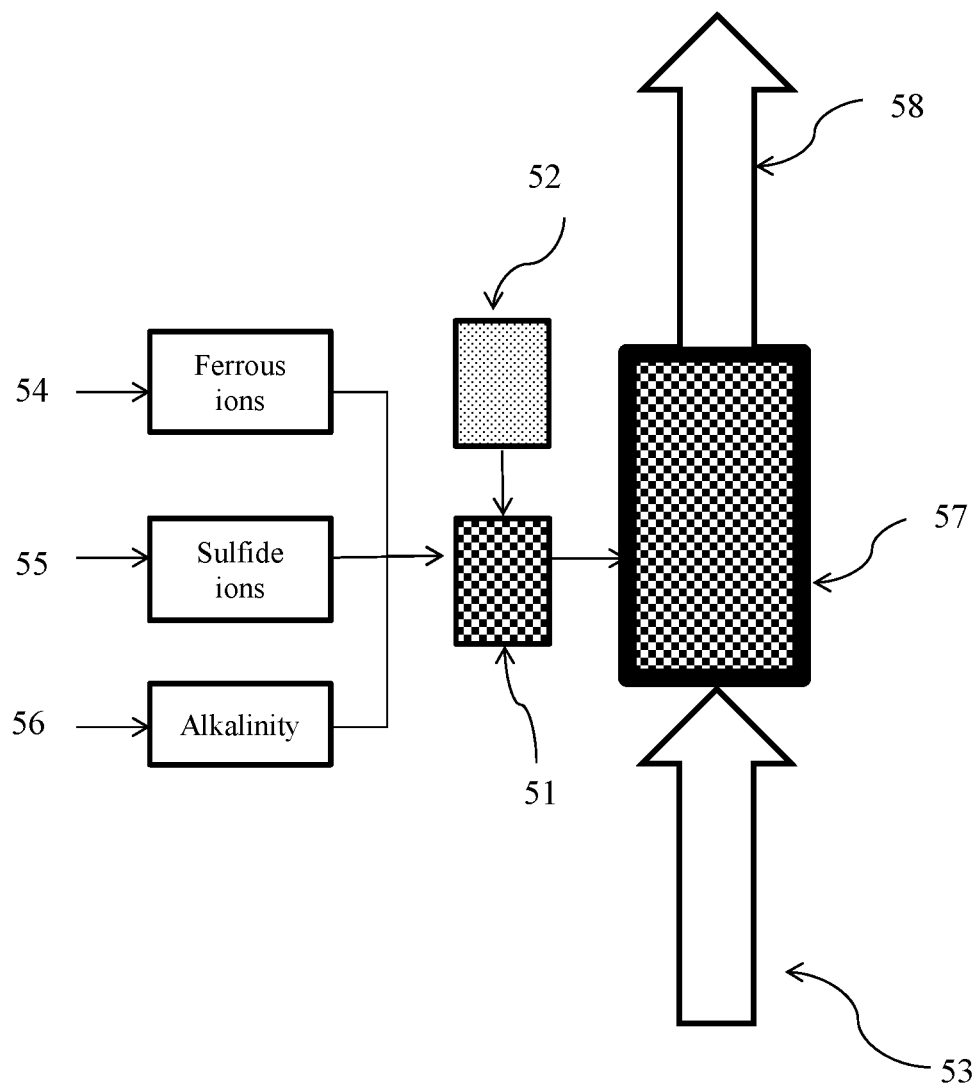
FIG. 5 is a diagram of a process for removing selenium from an industrial gas according to one embodiment of the present invention within a dry scrubber system whereby the industrial gas is passed through the dry scrubber sorbent.

FIG. 5 is a diagram of a process for removing selenium from an industrial gas according to another embodiment of the present invention. As depicted in FIG. 5 a source of ferrous ions (e.g. FeCl$_2$) 54, a source of sulfide ions (e.g. NaHS) 55, and an alkalinity source (e.g. NaOH) 56 are combined together to produce an alkaline liquid suspension of ferrous sulfide particles. The alkaline liquid suspension of ferrous sulfide particles is then coated onto or impregnated into a substrate 52. The then coated or impregnated substrate 51 is then placed into a cartridge or vessel 57 through which an industrial gas containing selenium 53 to produce a selenium-free industrial gas stream 58.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. A method of removing selenium from an industrial gas containing selenium which method comprises the steps of:
   providing an alkaline suspension of ferrous sulfide particles;
   contacting said industrial gas containing selenium with an alkaline liquid suspension of ferrous sulfide particles;
   contacting said industrial gas containing selenium with said alkaline liquid suspension of ferrous sulfide particles; and
   allowing the industrial gas containing selenium to react with said alkaline liquid suspension of ferrous sulfide particles and be removed by at least one of:
   i) adsorption onto said ferrous sulfide particles
   ii) adsorption onto iron (hydr)-oxides or green rusts that form in said alkaline liquid suspension of ferrous sulfide particles; and
   iii) absorption by reacting with sulfur formed in alkaline liquid suspension of ferrous sulfide particles and iron-selenium complexes or iron-selenium containing precipitates.

2. A method of removing selenium from an industrial gas containing selenium according to claim 1, wherein said step of providing alkaline liquid suspension of ferrous sulfide particles comprises combining together a ferrous ion source, a sulfide ion source and an alkalinity source to form said alkaline liquid suspension of ferrous sulfide particles.

3. A method of removing selenium from an industrial gas containing selenium according to claim 2, wherein said step of providing alkaline liquid suspension of ferrous sulfide particles comprises combining together ferrous chloride, sodium hydrosulfide and sodium hydroxide to form said alkaline liquid suspension of ferrous sulfide particles.

4. A method of removing selenium from an industrial gas containing selenium according to claim 3, further comprising controlling the amount of at least one of the ferrous chloride, sodium hydrosulfide and sodium hydroxide so as to control a ratio of selenium to ferrous sulfide in the alkaline liquid suspension of ferrous sulfide particles.

5. A method of removing selenium from an industrial gas containing selenium according to claim 2, further comprising controlling the amount of at least one of the ferrous ion source, the sulfide ion source and the alkalinity source so as to control a ratio of selenium to ferrous sulfide in the alkaline liquid suspension of ferrous sulfide particles.

6. A method of removing selenium from an industrial gas containing selenium according to claim 1, wherein the alkaline liquid suspension of ferrous sulfide particles inhibits the oxidation of lower valence states of selenium into selenate.

7. A method of removing selenium from an industrial gas containing selenium according to claim 1, wherein the step of contacting the industrial gas containing selenium with said alkaline liquid suspension of ferrous sulfide particles is performed in a wet scrubber system.

8. A method of removing selenium from an industrial gas containing selenium according to claim 1, wherein the step of contacting the industrial gas containing selenium with said alkaline liquid suspension of ferrous sulfide particles is conducted by either dispersing or injecting the industrial gas containing selenium into the alkaline liquid suspension of ferrous sulfide particles; spraying or injecting the alkaline liquid suspension of ferrous sulfide particles or ferrous sulfide particles into the industrial gas stream containing selenium; coating or impregnating the alkaline liquid suspension of ferrous sulfide particles onto or into a substrate and either injecting the substrate coated with the alkaline liquid suspension of ferrous sulfide particles into the industrial gas containing selenium or allowing the industrial gas containing selenium to pass through a vessel or container packed with a substrate that is coated or impregnated with the alkaline liquid suspension of ferrous sulfide.

9. A method of removing selenium from an industrial gas containing selenium according to claim 8, wherein said step of providing alkaline liquid suspension of ferrous sulfide particles comprises combining together a ferrous ion source, a sulfide ion source and an alkalinity source to form said alkaline liquid suspension of ferrous sulfide particles.

10. A method of removing selenium from an industrial gas containing selenium according to claim 9, wherein said step of providing alkaline liquid suspension of ferrous sulfide particles comprises combining together ferrous chloride, sodium hydrosulfide and sodium hydroxide to form said alkaline liquid suspension of ferrous sulfide particles.

11. A method of removing selenium from an industrial gas containing selenium according to claim 10, further comprising controlling the amount of at least one of the ferrous ion source, the sulfide ion source and the alkalinity source so as to control a ratio of selenium to ferrous sulfide in the alkaline liquid suspension of ferrous sulfide particles.

12. A method of removing selenium from an industrial gas containing selenium according to claim 11, further comprising controlling the amount of at least one of the ferrous chloride, sodium hydrosulfide and sodium hydroxide so as to control a ratio of selenium to ferrous sulfide in the alkaline liquid suspension of ferrous sulfide particles.

13. A method of removing selenium from an industrial gas containing selenium according to claim 8, wherein the alkaline liquid suspension of ferrous sulfide particles inhibits the oxidation of lower valence states of selenium into selenate.

14. A method of removing selenium from an industrial gas containing selenium according to claim 8, wherein the step of contacting the industrial gas containing selenium with said alkaline liquid suspension of ferrous sulfide particles is performed in a wet scrubber system.

15. In a method of using a wet gas scrubber to remove selenium from an industrial gas, said wet gas scrubber having a scrubber liquor and being configured for receiving and scrubbing said industrial gas with the scrubbing liquor, the improvement comprising providing as said scrubber liquor an alkaline liquid suspension of ferrous sulfide particles which removes selenium from the industrial gas by at least one of: i) adsorption onto said ferrous sulfide particles; ii) adsorption onto iron (hydr)-oxides or green rusts that form in said alkaline liquid suspension of ferrous sulfide particles; and iii) absorption by reacting with sulfur formed in alkaline liquid suspension of ferrous sulfide particles and iron-selenium complexes or iron-selenium containing precipitates.

16. A method of removing selenium from an industrial gas containing selenium according to claim 15, wherein the step of providing alkaline liquid suspension of ferrous sulfide particles comprises combining together a ferrous ion source, a sulfide ion source and an alkalinity source to form said alkaline liquid suspension of ferrous sulfide particles.

17. A method of removing selenium from an industrial gas containing selenium according to claim 16, further comprising controlling the amount of at least one of the ferrous ion source, the sulfide ion source and the alkalinity source so as to control a ratio of selenium to ferrous sulfide in the alkaline liquid suspension of ferrous sulfide particles.

18. A method of removing selenium from an industrial gas containing selenium according to claim 15, wherein the step of providing alkaline liquid suspension of ferrous sulfide particles comprises combining together ferrous chloride, sodium hydrosulfide and sodium hydroxide to form said alkaline liquid suspension of ferrous sulfide particles.

19. A method of removing selenium from an industrial gas containing selenium according to claim 18, further comprising controlling the amount of at least one of the ferrous chloride, sodium hydrosulfide and sodium hydroxide so as to control a ratio of selenium to ferrous sulfide in the alkaline liquid suspension of ferrous sulfide particles.

20. A method of using a wet gas scrubber to remove selenium from an industrial gas according to claim 18, wherein the alkaline liquid suspension of ferrous sulfide particles inhibits the oxidation of lower valence states of selenium into selenate.

* * * * *